Aug. 19, 1924.
A. BLOOM
COMBINED ROLLING PIN AND SIFTER
Filed Nov. 24, 1923
1,505,851
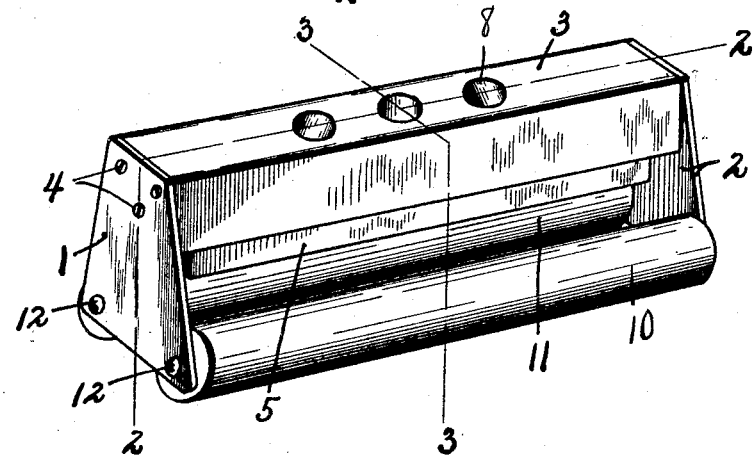
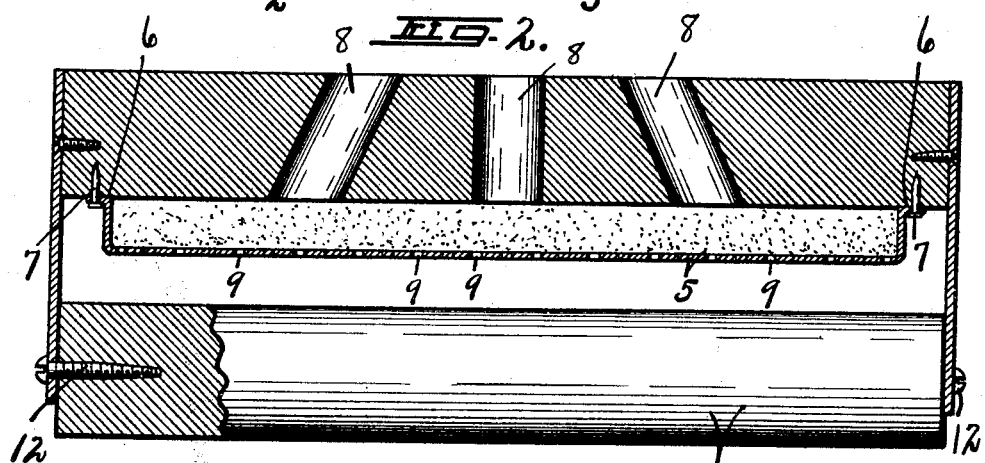
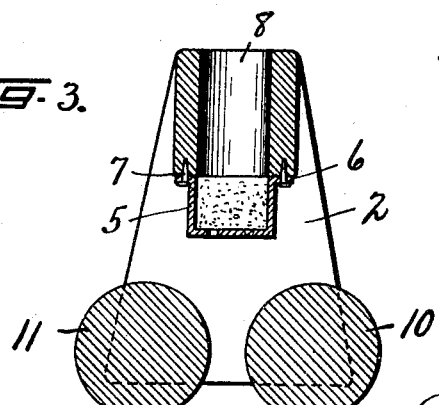
INVENTOR
Avid Bloom
BY
ATTORNEYS.

Patented Aug. 19, 1924.

1,505,851

UNITED STATES PATENT OFFICE.

AVID BLOOM, OF SYRACUSE, NEW YORK.

COMBINED ROLLING PIN AND SIFTER.

Application filed November 24, 1923. Serial No. 676,765.

*To all whom it may concern:*

Be it known that I, AVID BLOOM, a citizen of the United States of America, of Syracuse, in the county of Onondaga, in the State of New York, have invented new and useful Improvements in Combined Rolling Pins and Sifters, of which the following, taken in connection with the accompanying drawings, is a full, clear, and exact description.

This invention relates to certain improvements in combined rolling pin and sifter.

The main object of the invention is the production of a combined rolling pin and flour sifter of novel construction and efficient in the operation of simultaneously performing the dual functions of the structure.

Other objects and advantages relate to the details of the structure of the device, all as will more fully appear from the following description taken in connection with the accompanying drawings, in which:

Figure 1 is a perspective view of the article.

Figure 2 is a section on line 2—2, Figure 1.

Figure 3 is a section on line 3—3, Figure 1.

The article or device, as shown, comprises a pair of end plates or frames —1— and —2— respectively, preferably as illustrated, of trapezoidal form. The remaining structure of the apparatus is preferably as shown arranged between and supported by these end plates and comprises a cross bar —3— of any suitable form, and as here shown, of substantially rectangular elongated shape suitable for use as a handle to be grasped by the operator.

This cross bar —3— extends between the upper ends of the plates —1— and —2— and may be secured thereto in any suitable manner, as by screws —4—, nails or the like. This cross bar acts as a support for a suitable receptacle —5— adapted to contain flour or other material to be sifted. The receptacle is of much the same general form as the cross bar —2—, being of slightly less width and length, and may be formed of a rectangular dished sheet of metal having a flange —6— at its upper edge which extends outwardly, and is adapted to lie in contact with the lower surface of the cross bar —3— and may be secured thereto in any suitable manner, as by nails or tacks —7— to form a closed chamber except for the passageways or conduits —8— leading thru the cross bar —3— and the perforations —9— formed in the lower surface of the receptacle —5— and constituting such a receptacle an efficient sifting apparatus for such material as flour. The conduits —8— constitute a normally open means for supplying the material to be sifted to the receptacle —5—.

The rollers —10— and —11— are rotatably supported from the end frames —1— and —2— some distance below the receptacle —5— and are spaced apart as best shown in Figure 3 so as to permit a portion of the sifted material to fall between the rollers while the remaining portion may fall upon one or the other of the rollers and be utilized for a desired purpose as the roller rotates.

Preferably, as shown, the rollers —10— and —11— are rotatably journaled in opposite sides of the lower portion of the end frames —1— and —2— and any suitable means may be provided for effecting the journaling of the rollers in the end frames, and for that purpose I have illustrated headed screws —12— threaded into the opposite ends of the rollers and penetrating the end frames, and with their heads in substantial contact with the exterior surface of the end frames so that the screws may constitute journals rigid with the rollers and which are free to rotate in bearings in the end frames.

Altho I have shown and described a specific construction as illustrative of a perhaps preferred embodiment of my invention I do not desire to restrict myself to the exact form, shape or arrangement of the elements, as changes may be made within the scope of the appended claims.

I claim:

1. In an article of the class described, a pair of spaced end frames, a cross bar arranged between and secured to the end frames, a receptacle secured to and beneath the cross bar and provided with a plurality of perforations in its lower surface, and a pair of spaced rollers rotatably mounted in the end frames below said receptacle.

2. In an article of the class described, a pair of spaced end frames, a cross bar arranged between and secured to the end frames, a receptacle secured to and beneath the cross bar and provided with a plurality of perforations in its lower surface, a pair of spaced rollers rotatably mounted in the end frames below said receptacle, and a conduit extending through the cross bar and leading to said receptacle.

In witness whereof I have hereunto set my hand this 13th day of November, 1923.

AVID BLOOM.

Witness:
E. M. FRADENBURGH.